United States Patent [19]

Okui et al.

[11] Patent Number: 5,050,701

[45] Date of Patent: Sep. 24, 1991

[54] ENGINE MANIFOLDING AND ORIENTATION FOR THE ENGINE COMPARTMENT OF A MOTOR VEHICLE

[75] Inventors: Kaoru Okui; Manabu Kobayashi, both of Iwata, Japan

[73] Assignee: Yamaha Hatsudoki Kabushiki Kaisha, Iwata, Japan

[21] Appl. No.: 346,545

[22] Filed: May 2, 1989

[30] Foreign Application Priority Data

May 31, 1988 [JP] Japan .......... 63-131491
May 31, 1988 [JP] Japan .......... 63-131492
May 31, 1988 [JP] Japan .......... 63-131493

[51] Int. Cl.[5] .......... B60K 5/04; B60K 13/04

[52] U.S. Cl. .......... 180/297; 180/309; 180/68.1; 60/302; 123/52 M

[58] Field of Search .......... 180/68.1, 68.3, 89.2, 180/296, 297, 309, 312, 232, 274; 123/52 M, 52 MC, 198 R, 198 D; 60/302

[56] References Cited

U.S. PATENT DOCUMENTS 4,087,966 5/1978 Akado et al. .......... 60/302 X
4,372,112 2/1983 Ackerman et al. .......... 60/302 X
4,420,933 12/1983 Kajitani et al. .......... 60/302
4,497,286 2/1985 Masuda .......... 123/52 M
4,548,166 10/1985 Gest .......... 123/52 M
4,596,304 6/1986 Teshima .......... 180/297
4,598,786 7/1986 Kirchweger .......... 180/68.1
4,610,326 9/1986 Kirchweger et al. .......... 180/68.1
4,716,984 1/1988 Hiramatsu et al. .......... 180/297
4,726,337 2/1988 Yoshida .......... 123/52 M X
4,798,254 1/1989 Lings .......... 180/297 X
4,887,427 12/1989 Shinzawa et al. .......... 60/302 X

FOREIGN PATENT DOCUMENTS 1630968 4/1971 Fed. Rep. of Germany .
2700715 7/1978 Fed. Rep. of Germany .......... 180/309
3047963 7/1982 Fed. Rep. of Germany .......... 180/309
2369116 5/1978 France .
0077921 6/1977 Japan .......... 180/89.2
0037227 4/1978 Japan .......... 60/302
0168015 10/1982 Japan .......... 60/302
0028584 2/1983 Japan .......... 123/52 M

*Primary Examiner*—Andres Kashnikow
*Assistant Examiner*—Brian L. Johnson
*Attorney, Agent, or Firm*—Ernest A. Beutler

[57] ABSTRACT

A motor vehicle having a transversely positioned engine in a forwardly disposed engine compartment. The exhaust manifold is formed rearwardly of the engine and supplies exhaust gases to a catalyzer so that the engine will shield the exhaust manifold and catalyzer from cooling air flow. An intake manifold extends forwardly from the engine and engine accessories are disposed beneath the intake manifold and forwardly of the cylinders of the engine so as to shield the occupants of the vehicle from the noise of the accessories. In addition, a crushable plenum chamber extends across the front of the intake manifold and forwardly of the accessories for silencing and also to absorb impacts. The crushability of the plenum chamber causes it to slow the engine on impact for further safety protection.

8 Claims, 5 Drawing Sheets

55
54
16
53
19
21
52
53
34
46
38
23
18
39
24
39
40
41
43
44
66
12
39
64
22
45
17
17
11

38
39
40
39
48
39

34
21
46
46
46
39
38
39
40
69
65
4
4
40
39
41
43
44
74
73

34
21
24
69
68
65
57
58
62
59
64
67
72
73
74
19

21
56
34
51
47
23
18
49
35
25
24
63
46
36
37
33
38
27
32
62
26
39
28
61
57
69
58
29
41
71
59
64
43
62
42
68
67
44
74
72
73
19

ENGINE MANIFOLDING AND ORIENTATION FOR THE ENGINE COMPARTMENT OF A MOTOR VEHICLE

BACKGROUND OF THE INVENTION

This invention relates to an automotive engine and more particularly to an improved exhaust, intake and accessory drive arrangement for an automotive engine.

The use of transverse engines is widely adapted in many applications, such as in front wheel drive, front engine configurations or rear engine, rear wheel drive configurations. Normally, the engine extends transversely across the engine compartment and is disposed on one side of the final drive. Usually this type of configuration is employed with in-line engines and it is the normal practice to place the exhaust manifold of the engine at the forward or leading side of the engine. As a result, the air flow through the engine compartment tends to cool the exhaust manifold. Although this may have advantages in some applications, where a catalyzer is employed for treating the exhaust gases, the cooling of the exhaust gases before they reach the catalyzer can deteriorate the performance of the catalytic system. In fact, if the exhaust gases are cooled to too great an extent, the catalyzer will be ineffective.

It is, therefore, a principal object of this invention to provide an improved exhaust system for a transversely disposed automotive engine.

It is a further object of this invention to provide an improved catalytic exhaust gas treatment system for a transverse automotive engine.

It is, a still further object of this invention to provide an improved structure for the engine compartment of a vehicle that will absorb impacts on collision and protect the occupants.

It is a further object of this invention to provide an induction system for a transversely disposed front engine wherein the induction system is constructed so as to afford a crushability factor on impact and also so as to automatically effect a slowing of the speed of the engine.

Although the use of transverse engines has a number of advantages, the transverse disposition of the engine normally places the major components of the engine in close proximity to the passenger compartment. As a result, many of the noises generated by the engine are more readily transmitted to the engine occupants. Although insulation can afford some reduction of this noise, it is not the complete answer.

It is, therefore, a still further object of this invention to provide an improved arrangement for a transverse engine wherein the engine construction is such that it will itself dampen certain extraneous noise from transmission to the passenger compartment.

It is a further object of this invention to provide an engine layout wherein accessories of the engine are surrounded by components of the engine to effect silencing without adversely effecting servicing.

SUMMARY OF THE INVENTION

A first feature of this invention is adapted to be embodied in a motor vehicle having an engine compartment with a forward end disposed forwardly with respect to the normal direction of travel to the vehicle and a rearward end. An engine is disposed transversely in the engine compartment and this engine includes a cylinder arrangement having a plurality of rearwardly facing exhaust ports. An exhaust manifold is affixed to the cylinder arrangement rearwardly thereof for collecting the exhaust gases from the exhaust ports and shielded from air flow through the engine compartment by the cylinder arrangement. An exhaust catalyzer is positioned in proximity to the exhaust manifold for receiving and treating the exhaust gases flowing therefrom.

Another feature of this invention is adapted to be embodied in a motor vehicle having a forwardly positioned engine compartment. An engine is disposed transversely across the engine compartment. In accordance with this feature of the invention, an induction system for the engine includes an intake manifold that extends forwardly and a plenum device at the front of the engine for supplying air to the intake manifold. The plenum device is formed from a crushable material to absorb forces on vehicle front end impacts and for restricting the flow of air to the intake manifold under such conditions to reduce engine speed.

Yet another feature of the invention is adapted to be embodied in a motor vehicle having a passenger compartment and an engine compartment adjacent the passenger compartment. An engine extends transversely across the engine compartment and a manifold for the engine extends from a side of the engine that is spaced from the passenger compartment. In accordance with this feature of the invention, accessories driven by the engine are sheltered from the passenger compartment by the engine and the manifold. The manifold extends substantially continuously across its width for deflecting noises generated by the engine accessories downwardly and away from the passenger compartment.

DETAILED DESCRIPTION OF THE PREFERRED EMBODIMENT OF THE INVENTION

Figure 1:
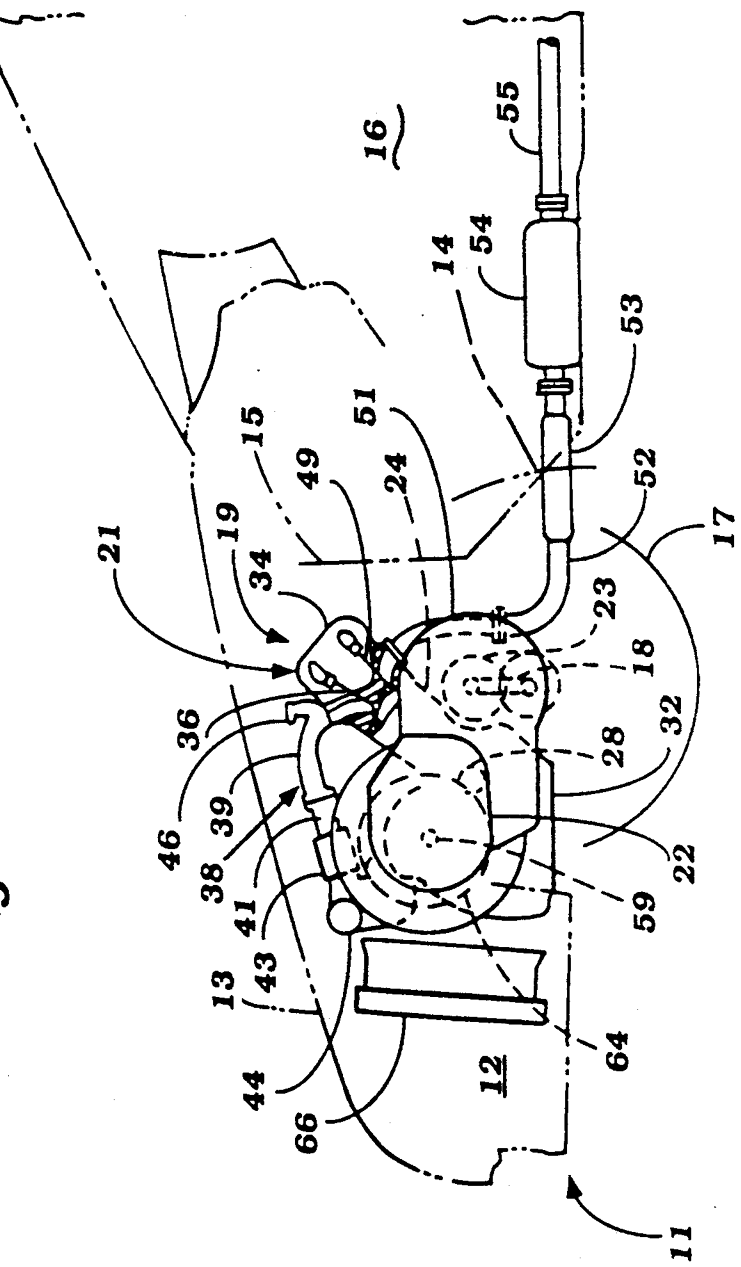
FIG. 1 is a side elevational view of a portion of a motor vehicle constructed in accordance with an embodiment of the invention. The power unit and accessories for it are depicted in solid lines while the motor vehicle per se is shown in phantom.
Figure 2:
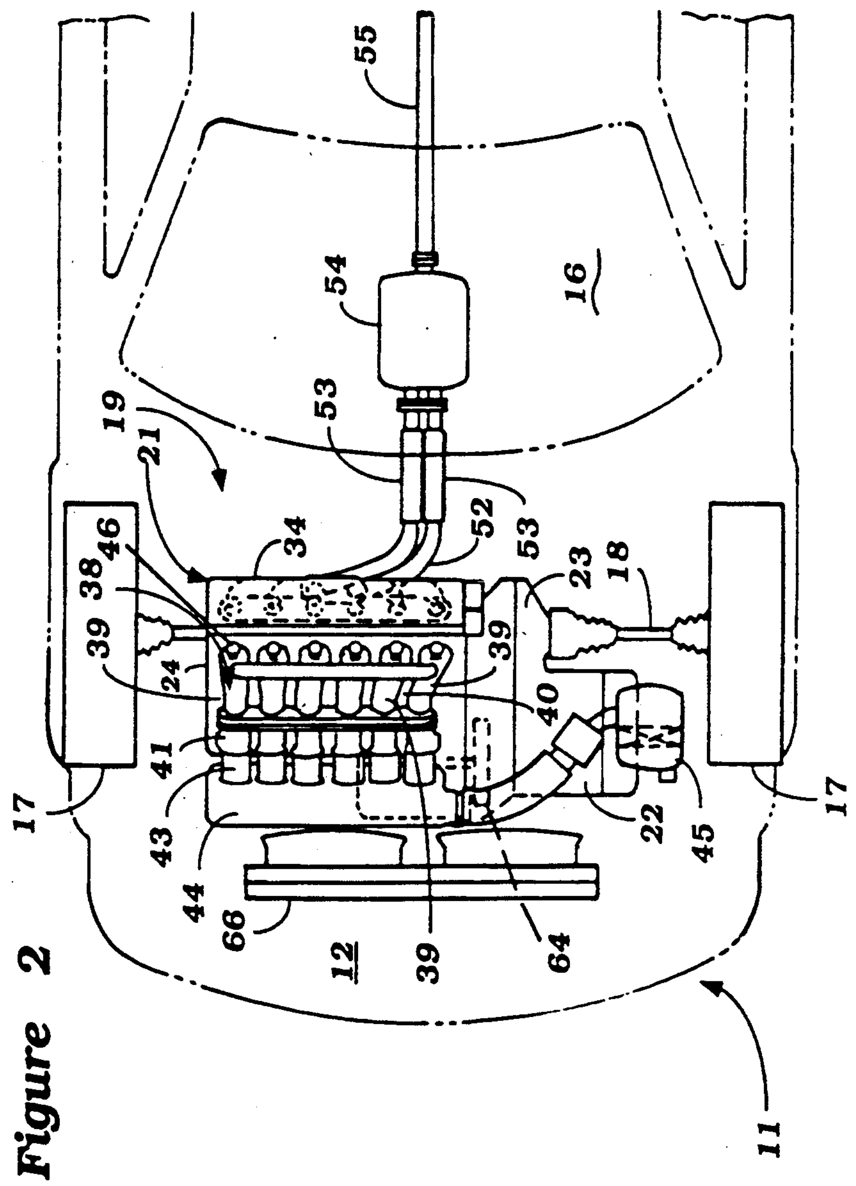
FIG. 2 is a top plan view of the portion of the vehicle shown in FIG. 1.

Referring first to FIGS. 1 and 2, a motor vehicle constructed in accordance with an embodiment of the invention is identified generally by the reference numeral 11. The motor vehicle 11 is depicted as being of the front engine, front wheel drive type and is adapted to carry one or more passengers. Although the invention is described in conjunction with such front engine, front wheel drive type vehicles, it is to be understood that the invention or at least certain facets of it have application with other types of motor vehicles or to engines per se.

The motor vehicle 11 is provided with a forwardly positioned engine compartment 12 that is defined in part by a downwardly sloping hood 13 of generally streamlined configuration. A toe board 14 and fire wall 15 separate the engine compartment 12 from a passenger's compartment 16 which may have any configuration. Inasmuch as the vehicle per se does not form a part of the invention, except insofar as its relationship the engine compartment 12 and the components contained therein, further discussion of the vehicle 11 is not believed to be required. Furthermore, for this reason, the vehicle 11 has been shown primarily in phantom.

An arrangement is provided for driving a pair of front wheels 17 of the vehicle 11. The front wheels 17 have associated with them axle shafts 18 by which the wheels are driven about axes of rotation that extend generally transverse to the vehicle 11. Of course, the front wheels 17 are supported for both suspension travel in a vertical direction and steering movement about generally vertically extending steering axes. To this end, the axle shafts 18 are connected to the front wheels 17 by means of homokinetic universal joints of any known type. The axle shafts 18 are powered by means of a power unit, indicated generally by the reference numeral 19 and which is comprised of an internal combustion engine 21, of a type to be described, a transmission 22 that is powered by the engine 21 and which drives the axle shafts 18 through a differential 23.

Figures 3, 4:
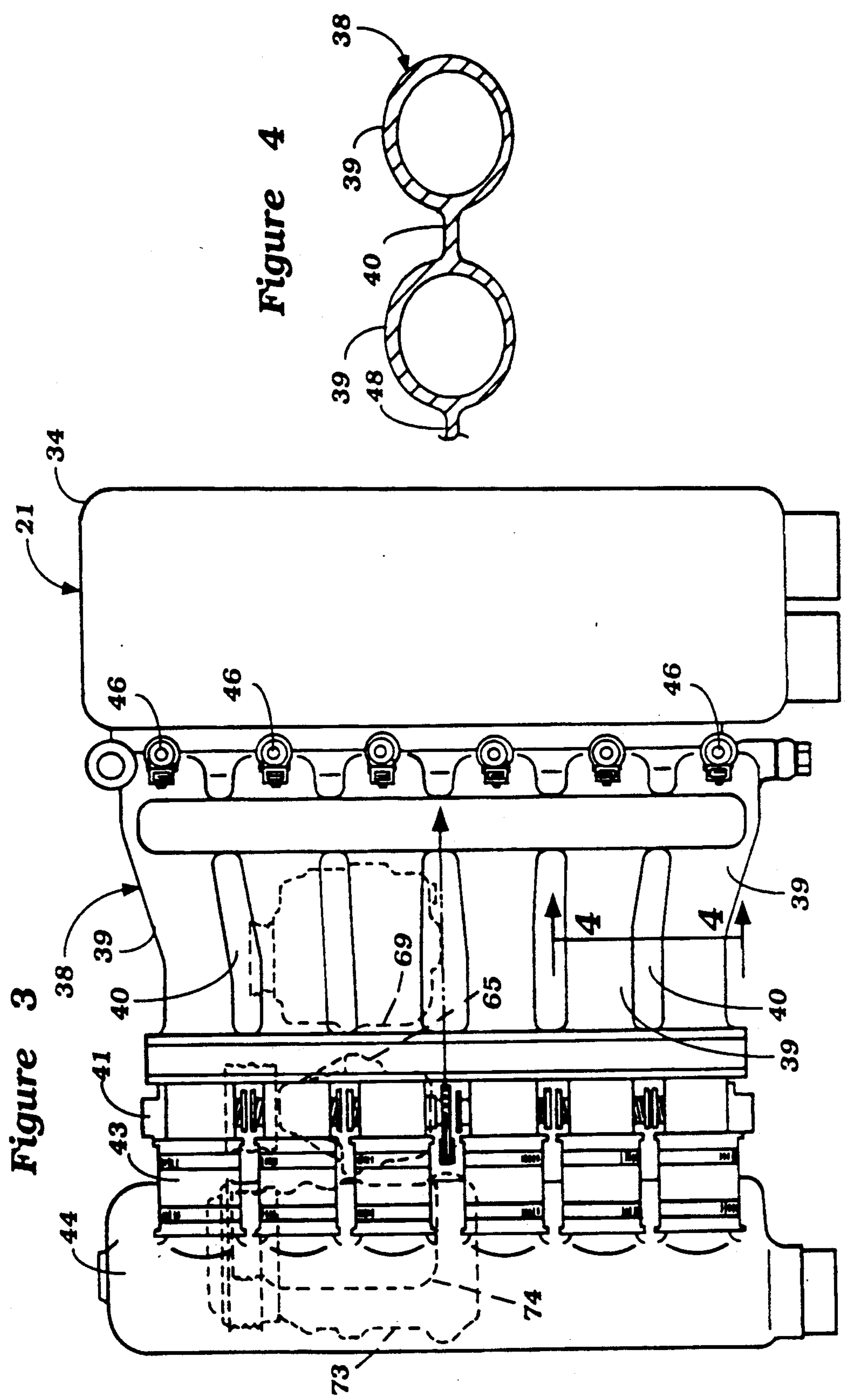
FIG. 3 is a further enlarged top plan view showing the power unit of the vehicle.
FIG. 4 is an enlarged cross-sectional view taken along the line 4—4 of FIG. 3.
Figure 5:
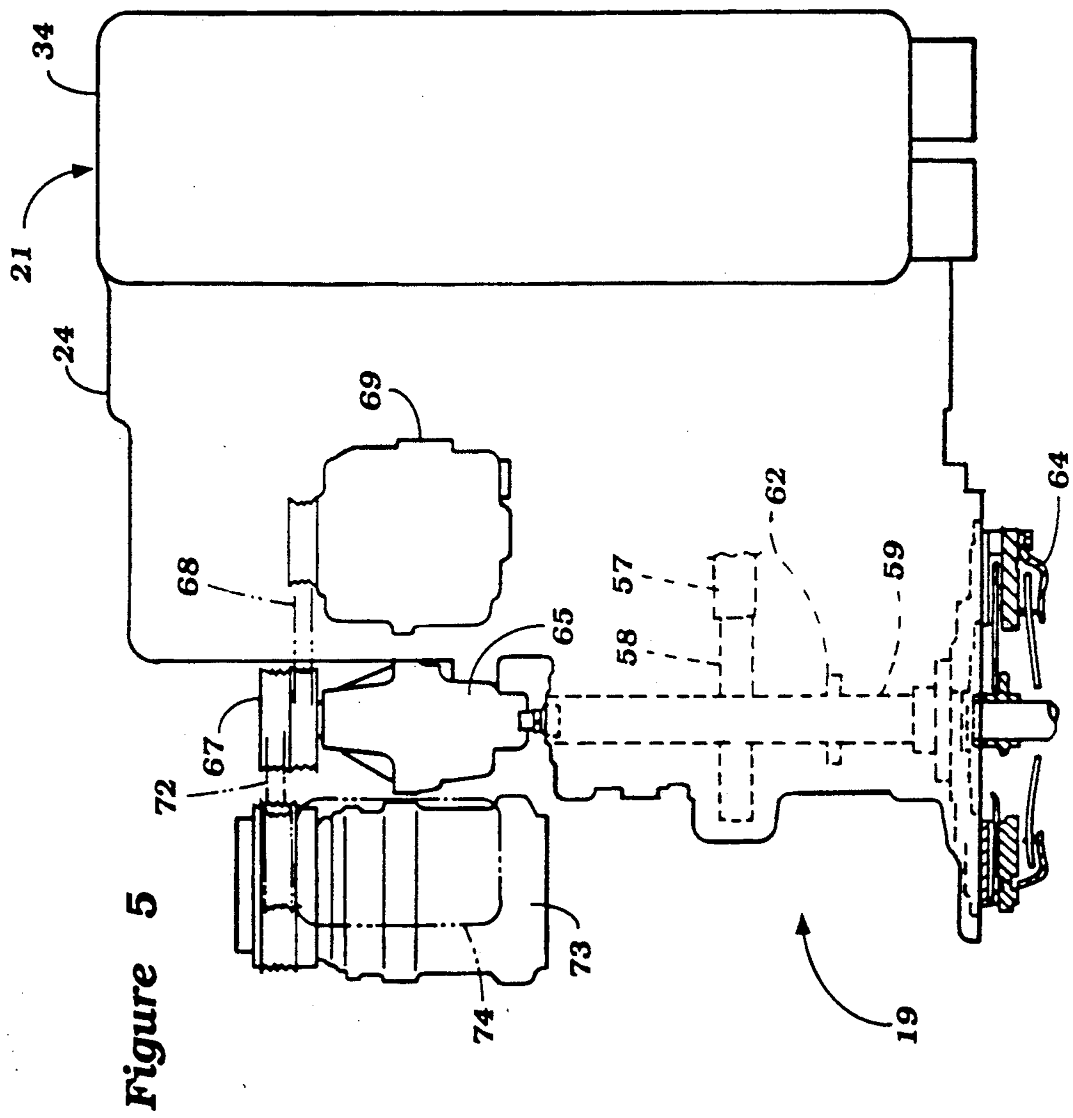
FIG. 5 is a further enlarged top plan view of the engine with the induction system removed and other portions broken away.

Referring now additionally and primarily to FIGS. 3 and 4, the engine 21 may be of any known type. In the illustrated embodiment, the engine 21 is depicted as being of the in-line, six cylinder, four cycle type. It is to be understood, however, that the invention may be utilized in conjunction with engines having other cylinder numbers or other cylinder configurations. Also, certain facets of the invention may be employed in conjunction with engines other than those of those of the reciprocating type. However, the invention has particular utility in in-line type of engines.

The engine 21 is comprised of a cylinder block 24 which may be formed of a light weight material such as cast aluminum alloy and which has cylinder liners 25 that define cylinder bores in which pistons 26 reciprocate. The cylinder bore axes define a plane that is inclined rearwardly from the vertical. As such the cylinder block 24 overlies the axles 18. The pistons 26 are connected by means of connecting rods 27 to a crankshaft 28 that is journaled within a dry sump crankcase 29 of the engine 21 in a known manner, as by means of spaced main bearings (not shown).

The crankcase 29 is defined by the lower end of the cylinder block 24 and a crankcase pan 32 that is joined to the cylinder block 24 in a suitable manner along an upwardly and forwardly inclined parting line 33 that is perpendicular to the plane defined by the cylinder bore axes.

A cylinder head 34 is affixed to the cylinder block 24 in a known manner and has individual recesses 35 that cooperate with the cylinder bores and pistons 26 to define the engine combustion chambers which combustion chambers are also identified by the reference numeral 35. Intake valves 36 are slidably supported in the cylinder head 34 and cooperate with intake passages 37 formed in the cylinder head 34 and by an intake manifold 38 for delivering a fuel air charge to the combustion chambers 35. It should be noted that the manifold 38 has a generally arcuate configuration with individual runners 39 for each of the combustion chambers 35 and/or intake valves 36. The runners 39 are connected by webs 40 so that the manifold 38 extends substantially continuously across the length of the engine. The manifold 38 curves arcuately forwardly and terminates in a throttle body 41 in which individual throttle valves 42 are positioned for controlling the flow through the intake passages 37. An inlet connector 43 is affixed to each of the throttle bodies 41 and extends into a transversely extending plenum chamber 44 that is positioned forwardly of the engine and which extends transversely across the engine compartment 12. The plenum chamber 44 is formed from a readily crushable material such as an aluminum alloy casting or a plastic for a reason to be described. An air inlet and filter element 45 is positioned at one end of the plenum chamber 44 for delivery of filtered fresh air to the plenum chamber 44.

It should be noted that the arcuate configuration of the induction system permits it to be very compact and still fall well below the hood line 13. To this end, the cylinder block 24 is canted rearwardly so that the cylinder liners 25 are inclined rearwardly from a vertically extending plane and lie over the axle shafts 18. This permits a very compact arrangement as well as a low hood line 13 without sacrificing serviceability or operation of the engine.

Fuel injectors 46 are supported in the cylinder head 34 and discharge fuel supplied in a known manner into the cylinder head intake passages 37 in proximity to the intake valves 36. The fuel injection system is controlled by any suitable arrangement.

An intake camshaft 47 is supported within the cylinder head 34 in an appropriate manner and operates the intake valves 36. The intake camshaft 47 is driven in a manner to be described.

Exhaust valves 49 are supported in the cylinder head 34 in a known manner so as to control the flow of exhaust gases from the combustion chambers 35 into cylinder head exhaust passages. The exhaust passages cooperate with an exhaust manifold 51. The exhaust manifold 51 conveys the exhaust gases to a pair of exhaust pipes 52 which, in turn, are connected by means of connectors 53 to a catalyzer 54 that is positioned in close proximity to the exhaust manifold 51. It should be noted that because of the rearward disposition of the exhaust manifold 51 and the exhaust connector pipes 52 and catalytic converter 54 that they will be sheltered from any cooling air flow. Hence the exhaust gases will not at all be cooled to any significant amount before they reach the catalyzer 54. As a result, the catalyzer 54 may operate at a high enough temperature so as to insure the desired catalytic reaction and treatment of the exhaust gases.

The exhaust gases are then discharged from the catalyzer 54, which may also serve as a muffler, to the atmosphere by means including a tailpipe 55. Further exhaust silencing devices may be incorporated in the tailpipe 55. However, the facet of the invention which is deemed to be important in conjunction with the design and construction of the engine and its relationship to the exhaust manifold 51 is that the exhaust manifold 51 is placed out of the stream of cooling air flow and will maintain the exhaust gases at a high temperature before they are delivered to the catalyzer 54 so as to insure good and efficient operation of the catalyzer.

The exhaust valves 49 are operated by means of an exhaust camshaft 56 that is journaled in the cylinder head 34 and rotates about an axis that is parallel to the axis of rotation of the intake camshaft 47. With conventional engines, it is the practice to drive the camshafts 47 and 56 from a camshaft drive arrangement located at one end of the crankshaft 28. The disadvantage with such an arrangement is that it adds to the overall length of the engine. This is not particularly desirable in connection with transverse engine placement of the type herein described. Therefore, in order to reduce the overall length of the engine 21 while still maintaining a generally simple construction, one of the cheeks of one of the throws of the crankshaft 28 is generally continuous and cylindrical and is provided with an external gear 57 as is described in more detail in application Ser. No. 270,357, entitled "Engine Unit For Vehicle," filed Nov. 14, 1988, now U.S. Pat. No. 5,024,287, in the names of Kaoru Okui and Manabu Kobayashi and assigned to the assignee of this application. The disclosure of that application is incorporated herein by reference.

Figure 6:
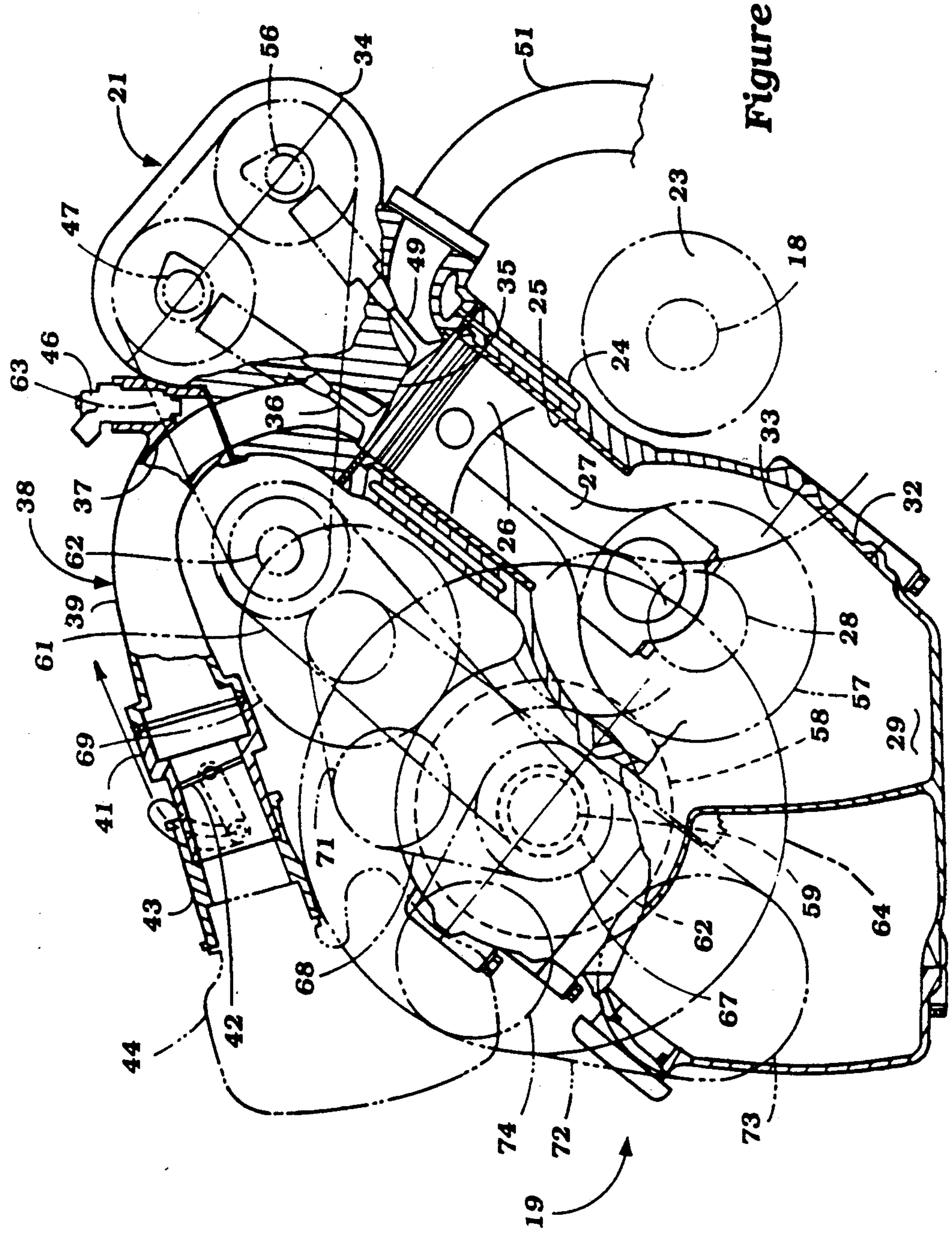
FIG. 6 is an enlarged side elevational view of the power unit, with portions broken away and shown in section.

The gear 57 meshes with a further gear 58 that is fixed for rotation with a shaft 59 supported for rotation about an axis that is parallel to the axis of rotation of the crankshaft 28 but which is offset forwardly of it. This relationship may be best seen in FIG. 6. A chain 61 transfers drive from a sprocket 62 fixed to the shaft 59 to a cam driving shaft 61 that is journaled appropriately in the interface between the cylinder block 24 and cylinder head 34. A further chain 63 drives the camshafts 47 and 56 from the camshaft driving shaft 62. If desired, an appropriate tensioner may be provided for the chains 61 and 63.

A friction clutch 64 is affixed to the end of the shaft 59 and is provided for driving the chain speed transmission 22 which, in turn, transfers drive to the differential 23 in any suitable manner. For example, this drive may be of the type of either of the embodiments shown in the aforenoted U.S. Pat. No. 5,024,287.

In accordance with a feature of the invention, a number of accessories are driven by the engine 21 and these accessories are positioned forwardly of the cylinder block 24 and beneath the intake manifold 38 so that any noise generated by these accessories will be shielded from the interior of the motor vehicle and particularly from the passenger compartment 16. As a result, it is possible to provide not only a compact construction but one in which there will be good sound deadening.

To this end, a water pump 65 is driven from the rear of the output shaft 59 and circulates coolant through the cooling jacket of the engine and a forwardly positioned radiator 66 that is positioned transversely across the inlet opening for the engine compartment 12. This cooling air will cool the intake manifold 38 and engine but will be sheltered, as aforenoted, from the exhaust manifold 51 and catalyzer 54.

A twin pulley 67 is affixed to an end of the water pump shaft and drives a first belt 68 which, in turn, drives an alternator 69 that is positioned forwardly of the engine and beneath the intake manifold for silencing, as aforenoted. In the drive for the alternator 69 there is provided an idler pulley 71 for tensioning of the belt 68 and the drive to the alternator, as is well know.

A second drive belt 72 is affixed to the pulley 67 and drives a number of other accessories such as an air conditioning compressor 73 and a power steering pump 74. The air conditioning compressor 73 and power steering pump 74 are also positioned beneath the intake manifold 38 and forwardly of the cylinder block so as to achieve the aforenoted silencing.

It should be also noted that the layout of the components is such that the intake manifold 38 and particularly the crushable plenum chamber 44 is positioned forwardly of these components. Hence, upon a front end impact, the plenum chamber 44 will be contacted by the crushing metal before any of the more massive accessories driven by the engine or by the engine itself. As has been previously noted, the plenum chamber 44 is formed from a readily crushable material and the effect of this is that impacts will be absorbed. The crushing of the plenum chamber 44 also will restrict the air flow into the intake manifold 38 and even if the engine throttle valves are still held in a wide open position due to some malfunction which has caused the crash, the engine will be slowed and impact further reduced.

It should be readily apparent from the foregoing description that the described construction provides an extremely compact relationship, one in which the exhaust gases are not cooled before they enter into the catalyzer and also wherein protection for accident is insured both by the crushability of the intake manifold and its plenum chamber and also by the slowing of the engine due to this crushing operation. Although an embodiment of the invention has been illustrated and described, various changes and modifications may be made without departing from the spirit and scope of the invention, as defined by the appended claims.

We claim:

1. In a motor vehicle having an engine compartment with a forward end disposed forwardly with respect to the normal direction of travel for said vehicle and a rearward end, means defining an air flow path through said engine compartment from the forward end toward the rearward end, an engine disposed transversely in said engine compartment, said engine including a cylinder arrangement having a plurality of rearwardly facing exhaust ports, an exhaust manifold affixed to said cylinder arrangement rearwardly thereof for collecting the exhaust gases from said exhaust ports and shielded from air flowing through said engine compartment by said cylinder arrangement, said cylinders being aligned and inclined rearwardly relative to said rearward end of said engine compartment for lowering said exhaust ports, and an exhaust catalyzer positioned in proximity to said exhaust manifold and at the lower portion of said vehicle and rearwardly of said engine compartment for receiving and catalyzing the exhaust gases flowing therefrom.

2. In a motor vehicle as set forth in claim 1 wherein the exhaust manifold lies at least in part beneath the rearwardly inclined cylinders.

3. In a motor vehicle as set forth in claim 1 wherein the engine is provided with an intake manifold that extends forwardly from the engine toward an air inlet of the air flow path.

4. In a motor vehicle as set forth in claim 3 wherein the intake manifold includes a crushable section adapted to be crushed upon forward impact and restrict the flow of air into the engine for slowing the engine.

5. In a motor vehicle as set forth in claim 3 further including a plurality of accessories driven by the engine and disposed forwardly of the cylinder arrangement and beneath the intake manifold for silencing of the noises emanating therefrom from occupants of the vehicle.

6. In a motor vehicle as set forth in claim 5 wherein the intake manifold includes a crushable section adapted to be crushed upon forward impact and restrict the flow of air into the engine for slowing the engine.

7. In a motor vehicle as set forth in claim 1 wherein there is positioned a passenger compartment adjacent the engine compartment and wherein the catalyzer extends beneath the passenger compartment.

8. In a motor vehicle as set forth in claim 7 wherein an exhaust manifold has an inlet portion that extends downwardly from the exhaust ports and an interconnected discharge portion extending rearwardly toward the passenger compartment and wherein the catalyzer communicates with the discharge portion of the exhaust manifold.

* * * * *